3,247,131
NEUTRON SHIELDING COMPOSITION HAVING GOOD HIGH TEMPERATURE STRENGTH

Joseph F. Bliss, Somerville, and John P. Gilvary, Plainfield, N.J., and Foster J. Castner, Fullerton, Calif., assignors to Union Carbide Corporation, a corporation of New York
No Drawing. Filed Apr. 4, 1963, Ser. No. 270,547
1 Claim. (Cl. 252—478)

This invention relates to compositions capable of efficiently alternating neutrons radiated by radioactive sources. More particularly, the invention relates to such compositions which are readily fabricated into simple or complex contours, and which retain compressive strengths at relatively high temperatures.

Radioactive sources such as atomic reactors must be shielded to prevent the escape of hazardous levels of radiation, composed of alpha, beta, and gamma rays essentially. Alpha rays are easily stopped. Gamma rays have bene effectively stopped (alternated) by lead and other dense materials. Beta rays (neutrons) however, are capable of passing through shields of lead and other dense materials. It has been found that substances with high hydrogen densities are capable of efficiently alternating fast-moving neutrons. Polymers of olefinically unsaturated hydrocarbons, e.g., polyethylene which have relatively high hydrogen densities, and are lightweight are efficient and practical neutron shielding materials, particularly for "portable" power reactors. Early attempts to use polyethylene encountered difficulty in conforming the necessarily thick sheets or slabs of the material to the irregular shape of the reactor parts. It was then attempted to make a more readily shapeable polyethylene containing mass, by combining a hardenable phenolic resin with particulate polyethylene, i.e., pellets, dice, or powder. This blend was cast into place with the aid of suitable molds. Phenolic binders were found to be deficient in that the phenolic resin had a short shelf life, making production schedules critical. Moreover acid catalysis of the curing reaction was dangerous and corrosive of metal parts. And the resin, once cured, was brittle and tended to crack if distorted. Moreover, phenolic resins characteristically liberated noxious phenol and formaldehyde fumes, which are intolerable in closed spaces, where many of these reactors are found.

The difficulties with phenolic resins can be overcome by the use of epoxy resins. However, epoxy resin formulations presently known lack good compressive strengths at elevated temperatures. Although elevated temperatures are not generally encountered in reactor shielding, there is always the possibility of an excessive rate of reactor activity, the so-called "runaway reactor," and therefore specifications for shielding material include good high temperature compressive strengths.

It is an object, therefore, of the present invention to provide compositions suitable for shielding neutron sources which have a high content of olefinically unsaturated hydrocarbon polymer, which are readily fabricable into simple or complex contours and which exhibit good compressive strengths over a wide temperature spectrum.

It has now been discovered that the above object and other objects which will be evident from the following description and claims are achieved with a composition comprising per 100 parts of a binder mixture from 30 to 90 parts, and preferably from 60 to 80 parts of a polyglycidyl ether of a polyhydric phenol and from 10 to 70 parts, preferably from 20 to 40 parts of bis(2,3-epoxy cyclopentyl)ether, and per 100 parts of the mixture from 40 to 80 parts of particulate form of a polymer of an olefinically unsaturated hydrocarbon, all parts being by weight.

The particular olefin polymer used in the present composition is not narrowly critical, it only being required that a high hydrogen density be provided. Suitable polymers, therefore, will include polymerized alpha-olefins containing from 2 to 4 carbon atoms, for example, alpha-olefins such as butene-1, propylene and especially ethylene. These polymers can contain minor amounts of other copolymerizable monomers. The form of the olefinically unsaturated hydrocarbon polymer should be particulate, i.e., in the form of granules, dice, chopped strands, or powder. Uniformity of particle size or particle geometry is not required.

The polyglycidyl ethers of polyhydric phenols useful herein are those having an epoxy equivalency greater than 1.0 as defined in U.S.P. 2,633,458. These organic monomeric or polymeric compounds contain a minimum of two and suitably three or four and more epoxy groups, i.e.,

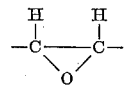

per molecule and can be saturated, unsaturated, aliphatic, cycloaliphatic, aromatic, or heterocyclic and can be unsubstituted or substituted with, for example, hydroxyl groups, halogen atoms, ether radicals and the like. Among the suitable di- and polynuclear phenols suitable for preparation of polyglycidyl ethers are the bisphenols described by Bender et al., in U.S. Patent 2,506,486.

The polyhydric phenol can be mononuclear such as resorcinol, catechol, methyl resorcinol or hydroquinone, or may be di- or polynuclear. The polyhydric polynuclear phenols can consist of two or more phenols connected by such groups as alkylidene, alkylene, ether, ketone or sulfone. The connecting groups are further exemplified by the following compounds: bis(p-hydroxyphenyl) ether, bis(p-hydroxyphenyl) ketone, bis(p-hydroxyphenyl) methane, bis(p-hydroxyphenyl) dimethyl methane, bis(p-hydroxyphenyl) benzophenone, 1,5-dihydroxynaphthalene, bis(p-hydroxyphenyl) sulfone, or a trisphenol or a tetraphenol e.g. having the formulas:

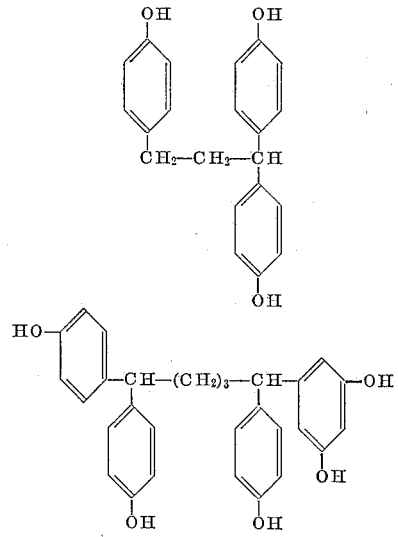

Bisphenol-A or 2,2-bis(4-hydroxyphenyl) propane is the preferred polyhydric phenol and resins made therefrom having epoxy assays of 150–500 are the preferred epoxy resins.

Generally, these polyglycidyl ethers of polyhydric phenols are prepared by the reaction of an epihalohydrin with the polyhydric phenol under basic conditions.

Preferred as the epihalohydrin for reaction with the above polyhydric phenols are epichlorohydrin, glycerol dichlorohydrin, 3-chloro-1,2-epoxy butane, 3-bromo-1,2 epoxy hexane, and 3-chloro-1,2 epoxyoctane.

Used with the polyglycidyl ether of a polyhydric phenol is bis(2,3-epoxycyclopentyl) ether which can be prepared by the method described in U.S. Patent 2,973,373 and U.S. Patent 3,063,949 both to B. Phillips & P. S. Starcher.

The polyglycidiyl ethers of polyhydric phenols and bis(2,3-epoxy-cyclopentyl) ether can be hardened or cured by conventional hardeners used in conventional amounts e.g. by reaction with organic acids, organic acid anhydrides or preferably primary and secondary polyamines in approximately stoichiometric amounts. Examples of suitable hardeners include ethylene diamine, diethylene triamine, triethylene tetramine, dimethylamine propylamine, boron trifluoride monoethylamino complexes, hydroxyethyl diethylene triamine, piperidine, α-methylbenzyl dimethylamine, tridimethyl amino methyl phenol, metaphenylene diamine, oxalic acid, phthalic anhydride, maleic anhydride, hexahydrophthalic anhydride, pyromellitic anhydride, chlorendic anhydride and the like.

The invention is illustrated by the following examples wherein all parts and percentages are by weight unless otherwise specified.

In each of the examples the indicated formulation of epoxy resins and hardener was weighed and hand mixed and added to a weighed quantity of pelletized polyethylene. This mass was then hand mixed, poured into trays, cured at room temperature and cut into samples for testing.

Formulations and results are presented in the table.

Epoxy resins:
"A" is a mixture of 80% diglycidyl ether of bisphenol-A and 20% bis(2,3-epoxy cyclopentyl ether); and
"B" is a mixture of 62.5% diglycidyl ether of bisphenol-A and 37.5% bis(2,3-epoxy cyclopentyl) ether.

Hardeners:
"Y" is diethylene triamine; and
"Z" is a eutectic blend of aromatic amines and bisphenol-A.

Polyethylene:
A 0.92 density polymer having a melt index of about 2, used as a 10:1 mixture of pellet and powder.

From a consideration of the table it can be seen that all the example formulations retain superior compressive strengths at elevated temperatures. The formulation of Example 7 is particularly outstanding at 240° C.

*Examples 8–9*

The procedures of Examples 1–7 are followed but using 30 parts diglycidyl ether of bisphenol-A and 70 parts bis(2,3-epoxycyclopentyl) ether (Example 8) and 90 parts diglycidyl ether of bisphenol-A and 10 parts bis(2,3-epoxycyclopentyl) ether (Example 9) each with (A) 40 parts of pelletized polypropylene and (B) 80 parts of pelletized ethylene/butene-1 copolymer.

In each instance Examples 8A, 8B, 9A and 9B improvements in compressive strengths at elevated temperatures are noted.

All of the above formulations are effective in alternating neutrons.

*Example 10*

An atomic reactor is sheathed in the formulation of Example 7 by molding the composition around the reactor, its piping and other associated parts. The composition easily flowed into place and after cure was nonbrittle and an effective alternator for neutron radiation.

What is claimed is:
Neutron radiation shielding composition having good high temperature compressive strengths comprising a binder and, per 100 parts by weight of said binder, from 40 to 80 parts by weight of particulate olefin polymer, said binder comprising
(1) from 30 to 90 parts by weight, per 100 parts by weight of said binder, of a polyglycidyl ether of a polyhydric phenol having an epoxy equivalency greater than 1,
(2) from 10 to 70 parts by weight, per 100 parts by weight of said binder, of bis(2,3-epoxycyclopentyl) ether, and
(3) approximately a stoichiometric amount of a hardener consisting of
    (a) from 25 to 75 parts by weight of an aliphatic amine, and
    (b) from 25 to 75 parts by weight of a eutectic blend of aromatic amines and bisphenol-A.

TABLE

| Example | Epoxy resin | Hardener | Percent of stoichiometric | Polyethylene [1] | Compressive Properties | | | | | |
|---|---|---|---|---|---|---|---|---|---|---|
| | | | | | At 25° C. | | At 150° C. | | At 240° C. | |
| | | | | | Strength [2] | Modulus ($10^6$) | Strength [2] | Modulus ($10^6$) | Strength [2] | Modulus ($10^6$) |
| 1 | A | Y | 100 | 65 | 2,090 | 0.86 | 1,120 | 0.038 | 330 | 0.008 |
| 2 | A | Y/Z | 75/25 | 64.1 | 1,940 | 0.087 | 1,260 | 0.042 | 400 | 0.013 |
| 3 | A | Y/Z | 50/50 | 63.5 | 1,770 | 0.095 | 1,120 | 0.043 | 380 | 0.011 |
| 4 | B | Y | 100 | 64.5 | 1,820 | 0.054 | 940 | 0.025 | 430 | 0.011 |
| 5 | B | Y/Z | 75/25 | 64.1 | 1,910 | 0.061 | 1,050 | 0.034 | 410 | 0.012 |
| 6 | B | Y/Z | 50/50 | 63.5 | 1,780 | 0.75 | 1,110 | 0.039 | 420 | 0.010 |
| 7 | B | Y/Z | 25/75 | 63 | 1,460 | 0.077 | 1,140 | 0.043 | 580 | 0.017 |
| Control I diglycidyl ether of bisphenol-A. | | Y | 100 | 65.2 | 1,700 | 0.53 | 970 | 0.037 | 299 | 0.009 |

[1] Percent by weight based on the total weight of mixture.
[2] Reported in pounds per square inch.

References Cited by the Examiner

UNITED STATES PATENTS

| | | | |
|---|---|---|---|
| 2,925,403 | 2/1960 | Shokal | 260—45.5 X |
| 2,935,488 | 5/1960 | Phillips et al. | 260—830 |
| 2,961,415 | 11/1960 | Axelrad | 252—478 |
| 3,057,812 | 10/1962 | Straughan et al. | 260—45.5 |
| 3,092,610 | 6/1963 | Schwarzer | 260—45.5 |
| 3,100,756 | 8/1963 | Fry | 260—830 |
| 3,106,535 | 10/1963 | Blanco. | |
| 3,113,089 | 12/1963 | Nagey et al. | |

REUBEN EPSTEIN, *Primary Examiner.*

CARL D. QUARFORTH, *Examiner.*